March 17, 1936. E. G. COLSON 2,034,507
METHOD OF AND MEANS FOR REFINISHING BALL BEARINGS
Filed Sept. 23, 1932 2 Sheets-Sheet 1
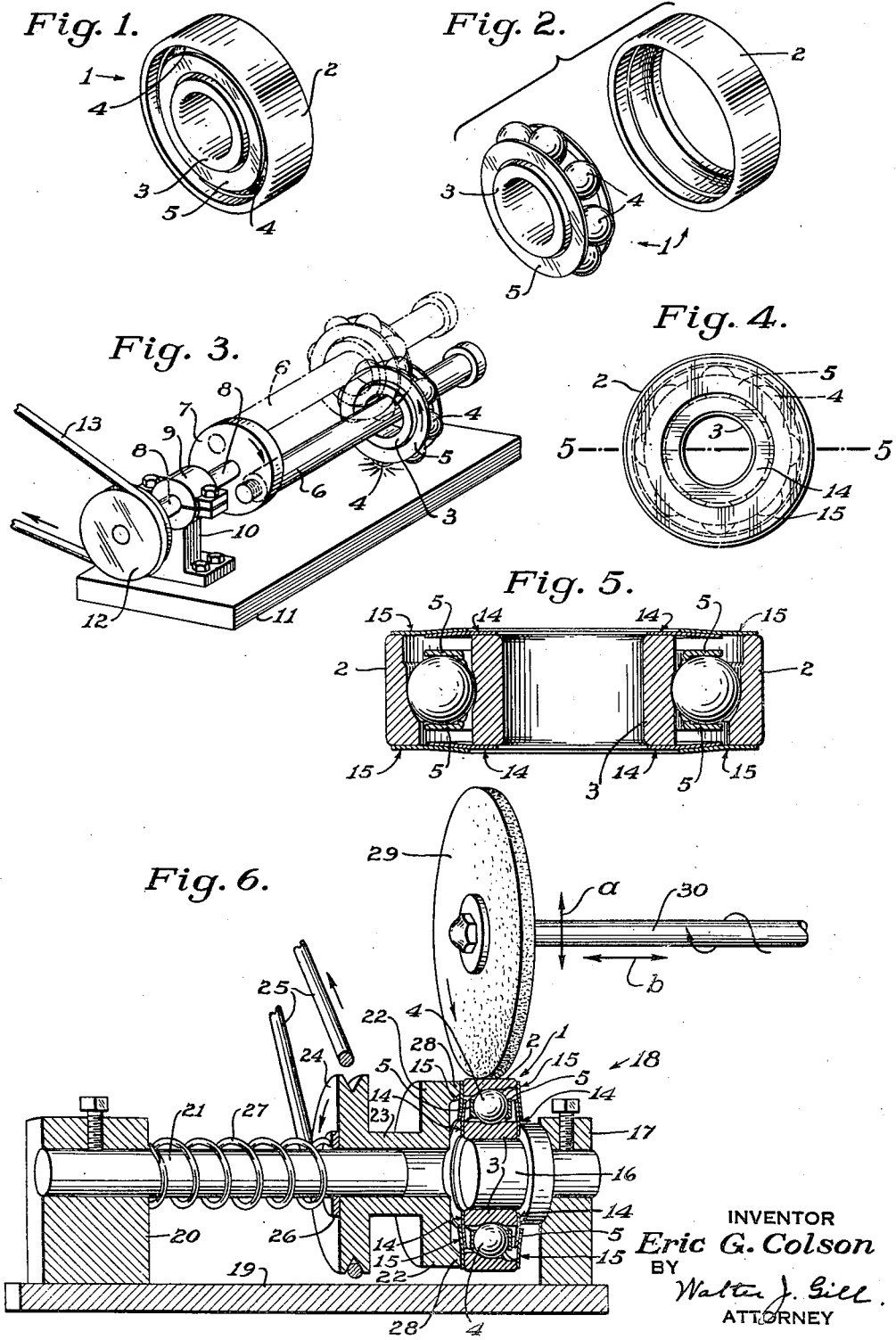
INVENTOR
Eric G. Colson
BY Walter J. Gill
ATTORNEY March 17, 1936.  E. G. COLSON  2,034,507

METHOD OF AND MEANS FOR REFINISHING BALL BEARINGS

Filed Sept. 23, 1932  2 Sheets-Sheet 2

INVENTOR
Eric G. Colson
BY Walter J. Gill
ATTORNEY

Patented Mar. 17, 1936

2,034,507

UNITED STATES PATENT OFFICE 2,034,507

METHOD OF AND MEANS FOR REFINISHING BALL BEARINGS

Eric G. Colson, New York, N. Y., assignor to Ford Instrument Company, Inc., Long Island City, N. Y., a corporation of New York Application September 23, 1932, Serial No. 634,478

10 Claims. (Cl. 51—278)

The present invention relates to a method of and means for refinishing ball bearings to greatly increase their accuracy. It is at present customary to manufacture and test the different elements that go to make up a ball bearing separately and with great care, and to subsequently select the proper elements for individual bearings and assemble them to form complete bearings. Thus, the individual parts of a given bearing are tested with elaborate testing devices for intended accuracy, but without due regard to the accurate correlation of the parts that finally become the elements of a single bearing. It has been discovered that the absence of correlated testing and treatment introduces seemingly insignificant inaccuracies into the ball bearings, which the subsequent use of them for certain important purposes reveals are serious enough to unfit the bearings for such particular employment. It is accordingly a purpose of this invention to provide a method and means whereby the elements of any particular ball bearing are treated and tested in their proper correlation to eventuate into a finely accurate bearing of the character referred to.

Commercial ball bearings produced by the methods now in vogue serve satisfactorily for many purposes, particularly where the chief consideration is the mounting of revoluble bodies for movement with much reduced friction. However, precision mechanisms, especially those constituting mathematical computing instruments, make other important demands, such as the exact preservation of the location of the axes of gear-bearing shafts. The axis preservation of the shafts of gyroscopes or of those of the transmitters and receivers of electrical transmission systems is also highly important.

Failure to preserve the intended axes of rotation in extensive and intricate computing mechanisms wherein commercial ball bearings are used, will effect a multiplication and ultimate summation of individually small errors, in consequence of which the resultant computed quantity will be inaccurate to more than a permissible degree. By mounting the shafts of the rotors of gyroscopes in ball bearings refinished by the method disclosed herein, one of the most important considerations in the assembly of a gyroscope, namely, the balancing thereof, is taken care of to such a high degree as to vastly improve the efficiency of the gyroscope. Ordinary commercial ball bearings, such as are at present used to mount the shafts of gyroscopes, possess enough inaccuracy to fail to adequately preserve the precise shaft axis location necessary to the very fine balance required by gyroscopes in operation. Consequently, the gyroscope is influenced by the slightly imperfect balance to precess, and its consequent aberration usually interferes greatly with the proper functioning of the device under gyroscopic control for this reason. In dial-carrying transmitters and receivers of electrical transmission systems, the dials have been found not to register with their respective indices with the desired accuracy, due to shaft inclination, when commercial ball bearings are installed therein for mounting the shaft. This trouble is substantially eliminated by using ball bearings as refinished by the process that constitutes the present invention.

Minute investigation has disclosed that the external peripheries of the outer ball races of commercial ball bearings of supposedly the same size, as well as the bore surfaces of the inner ball races thereof, vary radially to a considerable extent, in terms of ten-thousandths of an inch. Used to mount shafts, the latter acquire very small but nevertheless positively present eccentricity. Of no consequence in ordinary machinery, the total effect upon computing mechanism is to render it seriously unsatisfactory.

It is accordingly an object of this invention to take advantage of the lower cost of commercial ball bearings and to refinish the same inexpensively in such manner that they acquire extreme accuracy well suited to the most exacting requirements that may be imposed upon anti-friction devices of this character. The various advantages and attainments of the invention will become more fully apparent hereinafter, and all of them are to be understood as coming within the scope of the present inventive concept.

Referring to the drawings,

Fig. 1 is a perspective view of a commercial ball bearing of usual form;

Fig. 2 is another perspective view of the ball bearing with its outer ball race removed;

Fig. 3 is a perspective view of the inner ball race, the balls and ball cage retained in mutual combination, and being subjected to dry cleaning;

Fig. 4 is a side elevation of the reassembled ball bearing subsequent to the dry cleaning of its parts, and with the interior of the bearing being sealed;

Fig. 5 is an enlarged cross section of ball bearing at this stage of its treatment, the section being taken on the line 5—5 of Fig. 4;

Fig. 6 is a perspective view, partly in section, showing the outer periphery of the sealed ball bearing being refinished;

Figure 7:
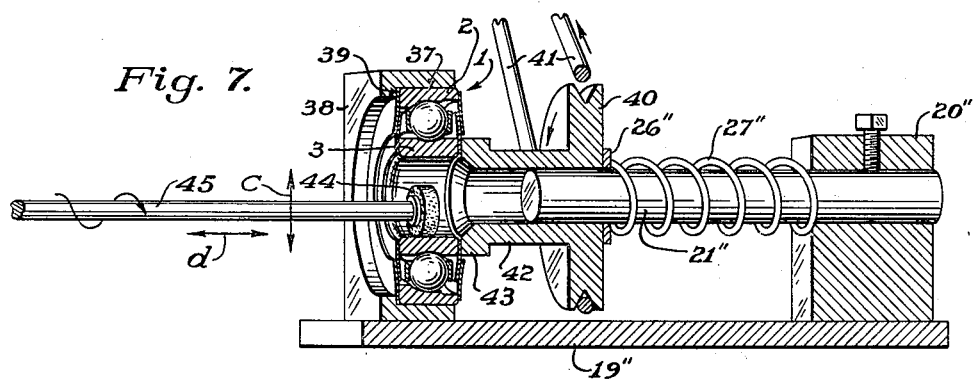
Fig. 7 is another perspective view, partly in section, showing the bore of the inner ball race of the bearing being refinished.

In the drawings, 1 denotes generally a commercial ball bearing, which may be of any of the usual types, but which is here shown as comprising an outer ball race 2, an inner ball race 3, annularly arranged balls 4 and a ball cage 5 in which the balls are retained. The ball bearing shown in Fig. 1 is of a type in which the outer ball race 2 is removable by manual manipulation. In some other forms, it requires tools to effect the separation.

The different parts of the ball bearing are first cleaned with a grease removing agent, which may include or be gasoline or amolin, to remove the lubricant which is applied to the ball bearing by the manufacturer at the time of its completion.

Particles of dust or dirt have, however, been found to adhere to the parts of the ball bearing after they have dried subsequently to such initial cleansing, and, therefore, the parts are separated, substantially as shown in Fig. 2. The outer ball race 2 is then dry cleaned, as by being wiped off with a dry cloth, for example.

In the condition of assembly in which they are shown in Fig. 2, the inner ball race 3, the balls 4 and the ball-retaining cage 5 are mounted on an eccentric crank pin 6 that is carried by a wheel 7, as shown in Fig. 3. The wheel 7 is fast on a shaft 8 that is journalled in a bearing 9 which is at the top of a standard 10, the base of which is fastened to a surface plate 11 serving as a base for the dry cleaning device. A driving pulley 12 is driven by a belt 13 preferably of uniform cross section throughout its length, thereby rotating the shaft 8 and the wheel 7 so that the crank pin 6 is moved through a circular orbit. Consequently, the sub-assembly comprising the parts 3, 4 and 5 of the ball bearing 1 are carried with the crank pin 6, and hang thereon with some degree of eccentricity thereto.

As a result, the lowermost ball 4 is swung downward with a momentary sharp impact against the upper surface of the plate 11. This action continues over an appropriate period, with the effect that the momentary retardation of the impinging ball 4 occasioned by its impact against the surface plate 11 together with the continued travel of the crank pin 6, partly turns the sub-assembly of the ball bearing being treated. Thus, another ball 4 is brought lowermost to momentarily strike the surface plate 11, and the work 3, 4 and 5 is further turned, continuous repetition of this action taking place. In this manner, the partial assembly 3, 4 and 5 of the ball bearing is turned about its own normal axis of rotation, and the successive balls 4 strike the surface plate 11 with sharp blows. Continued for a requisite period of time, this process dislodges the foreign particles that are on the parts 3, 4 and 5 of the partial ball bearing assembly, dry cleaning the same.

When the inner ball race 3, the balls 4 and the ball cage 5 have been apparently properly dry cleaned, the sub-assembly of the ball bearing composed of these parts is removed from the crank pin 6. Thereafter, these removed parts and the outer ball race 2 are reassembled into their original relationship, restoring the ball bearing 1 to its former mechanical correlation. The ball bearing 1 is then tested as to the effectiveness of the dry cleaning to which it has been subjected. This is preferably done by laying the completely assembled ball bearing in the palm of one hand, applying the end of a finger of the other hand against the inner ball race 3, say, so the tip of the finger is pushed as though to enter the bore of the inner ball race, and then relatively rotatively moving the palm of the first mentioned hand and the end of the finger of the other hand. There will then be relative rotary movement between the outer ball race 2, the balls 4 and the inner ball race 3. The nerves in the hand and finger will very sensitively detect any minor roughness in the rotary movements between the parts of the ball bearing, which roughness will indicate that the bearing has not been completely cleaned, while thorough smoothness of feeling will denote that the bearing has been completely cleaned. Bearings not passing this test must be dry cleaned again.

Washers 14, which may be of paper or other suitable material, are adhesively applied to opposite sides of the inner ball race 3, as shown in Figs. 4 and 5. Larger washers 15 of similar material are likewise adhesively applied to the opposite sides of the outer ball race 2. The outer circumferential margins of the washers 14 and the inner circumferential margins of the washers 15 overlap. The interior of the dry cleaned ball bearing is accordingly substantially sealed from the exterior atmosphere.

With the ball bearing in this condition, its inner race 3 is slipped onto a stud 16 that is fixedly mounted on a standard 17 which extends upward from a base 19 of a grinding machine 18, shown in Fig. 6, the fit being sufficiently close to frictionally hold the inner race 3 from turning. Another standard 20 also extends upward from the base 19, and fixedly mounted thereon is a stationary axle 21 on which a driving friction wheel 22 is revolubly and slidably mounted. Integrally connected with the driving friction wheel 22 by a common hub 23 is a pulley 24 that is adapted to be driven by a belt 25 of uniform cross section throughout its length. A washer 26 lies against the terminal face of the pulley 24, and a helical spring 27 surrounds the stationary axle 21, its opposite ends bearing against the standard 20 and the washer 26, respectively. The rigidly combined pulley 24 and friction wheel 22 are, therefore, urged toward the ball bearing 1 that is mounted on the stud 16.

On the side adjacent to the ball bearing 1, the friction wheel 22 is recessed to clear the stud 16 and the ball bearing, except for a contact annulus 28, which exists in consequence of the presence of the recess. The inner and outer diameters of the contact annulus 28 under the influence of spring 27, bear only against the outer circumferential margin of the adjacent washer 15 that overlaps the corresponding side of the outer ball race 2. Therefore, as the pulley 24, and, hence, the driving friction wheel 22 are revolubly driven by the belt 25, the friction wheel 22 directly drives only the outer ball race 2, the balls 4, however, being driven thereby on the inner ball race 3.

The stud 16 is on a true dead center and is accurately machined so that its axis constitutes an initial datum. Since the driving friction wheel 22 is thrust against the adjacent side of the ball race 2 by the spring 27, and the inner race 3 has been pushed against a shoulder on the stud 16, the lateral pressure against the outer ball race 2 serves to urge and hold the raceways of both ball races and the annular row of balls therebetween in true mutual concentricity.

Brought into contact with the external periphery of the outer ball race 2 is an emery or other abrasive grinding wheel 29 that is mounted on a driven shaft 30. Inasmuch as the means for driving and controlling the grinding wheel are well-known, they have not been shown. It is sufficient to indicate by the arrow $a$ that the grinding wheel 29 is brought into contact with and retracted from the periphery of the outer ball race 2, and by the arrow $b$ that the grinding wheel is fed laterally back and forth across such periphery. The fine feeding of the edge of the grinding wheel 29 by known means against the periphery of outer ball race 2, and inward toward the center of the fixed stud 16 by the required number of ten-thousandths of an inch, in conjunction with the lateral feeding of the grinding wheel across the periphery of the outer ball race 2, reduces the external diameter of the ball bearing 1 to the desired degree of exactness, in concentricity with the raceways of the inner and outer ball races.

Figure 8:
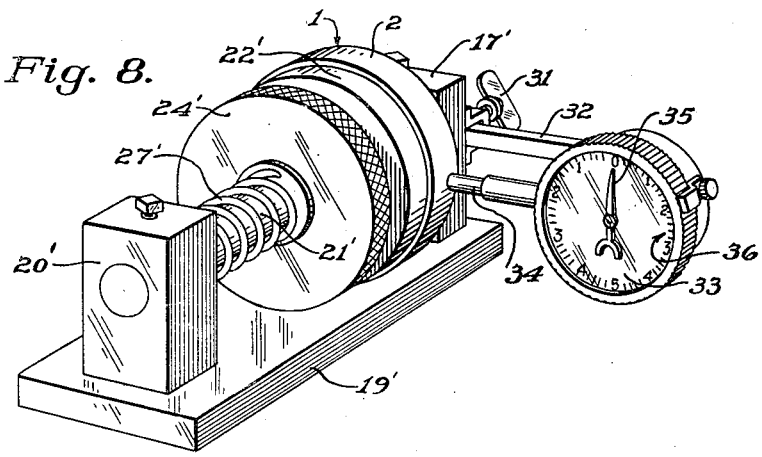
Fig. 8 is a perspective view, illustrating the testing of the external periphery of the outer ball race to determine its degree of accuracy with respect to its exactly intended diameter.

To know how much grinding is required to attain this end, and to determine when the required grinding has been accomplished, a micrometric measuring fixture of the type shown in Fig. 8 is employed. Except for the absence of grinding mechanism, it is for the most part of the same construction as the device of Fig. 6, and, therefore, need not be described further than is necessary to make its use apparent.

The measuring fixture of Fig. 8 is provided with a base 19' and standards 17' and 20'. It is also provided with a stud (not shown) corresponding to stud 16 of the device of Fig. 6 on which the ball bearing 1 is mounted as in that figure. On the stationary axle 21' that is fixedly mounted on the standard 20', a driving friction wheel 22' is rotatably mounted and rigid therewith is a knurled turning knob 24'. The spring 27' bears at one end against the standard 20', and forces the rigidly combined turning knob 24' and the driving friction wheel 22' toward the ball bearing 1, the wheel 22' only pressing against the outer ball race 2 of the bearing in the manner shown in Fig. 6.

Removably clamped by set screw 31 to the standard 17' is an arm 32, on which is detachably carried a micrometer indicator 33, having a plunger 34 that is adjustably applied to the external periphery of the ball race 2 radially of the ball bearing.

As the calculated design of any precision apparatus discloses the exact tolerances permissible in the positioning of its included shafts, gears, etc., a testing in the micrometric measuring device of Fig. 8 of commercial ball bearings will determine their fitness for preserving the axes of the shafts in required position with the requisite exactness. Experience has shown that where the required exactness approaches fineness, as is often the case in calculating apparatus wherein minute oscillatory displacement of the axes of the shafts is angularly multiplied in gear trains responsive thereto, commercial ball bearings have too great tolerances in their so-called outer and inner diameters to meet the required preservation of axis stabilization.

Where such tolerances are insufficiently fine it will be found that the radii of the periphery of the outer ball race and of the bore of the inner ball race of the ball bearing may, and in commercial ball bearings commonly do, vary unequally. Unless, fortuitously, radial variations in both the outer and inner ball races cancel each other, the ball bearing will become mounted eccentrically to the intended axis of rotation of the shaft one end of which is journalled therein. This alone, or in conjunction with similar eccentricity in the other ball bearing in which the opposite end of the shaft is journalled, will angularly displace the axis of the shaft from its proper axis of rotation. Under such circumstances, the axis of the shaft is inclined slightly to the axes of rotation of the respective ball bearings. Not only will the shaft then run harder in the bearings, but the latter will wear and the shaft will begin to wobble. While this wobbling action may be substantially unnoticeable visually, it is, nevertheless, sufficient to affect the accuracy of the shafts, gearing, etc., of fine calculating mechanisms whereby the value of a quantity being transmitted thereby ultimately becomes so inaccurate as not to be dependable.

By inserting a commercial ball bearing 1 in the testing device of Fig. 8, applying the end of the plunger 34 of the indicator 33 to the periphery of the outer ball race 2, and thereafter turning the knob 24', the radial variances in the outside periphery of the ball bearing are disclosed by a pointer 35 as it is deflected over a scale 36. The indicator readings are usually in terms of ten-thousandths of an inch, and the radial variations in the outside circumference of fine commercial ball bearings frequently equal six to eight, or more, ten-thousandths of an inch. By the herein described method of refinishing commercial ball bearings, the radial variance of the outside diameter is reduced up to about ten-fold.

Further lack of great accuracy in commercial ball bearings for use in fine and complex calculating instruments, and other devices, lies in similar radial variations in the bore of the inner ball race 3, which is commonly called the inside diameter of the bearing. To treat the commercial ball bearing to eliminate this objectionable feature, after the periphery of its outer ball race 2 has been ground to the required exactness, as already described, the ball bearing is inserted into a just as accurately finished circular socket 37 in a standard 38 of a second grinding machine, shown in Fig. 7. Preferably the ball bearing 1 is pushed into the socket 37 until the washer on the outer ball race 2 comes against a shoulder 39. The fit between the surfaces of the socket 37 and the periphery of the outer ball race 2 of the bearing is sufficiently close to frictionally prevent rotation of the outer ball race 2 in the socket, but is not too tight to prevent this ball race from being subsequently pushed out of the socket with reasonable ease.

Mounted on the same base 19" as the standard 38 is another standard 20", in which is fixedly mounted a stationary axle 21". Revolubly and slidably mounted on the stationary axis 21" is a pulley 40 that is adapted to be driven by a belt 41 of uniform thickness throughout its length. Integral with the pulley 40 is a hub 42 also formed as one with which is a driving friction wheel 43. A washer 26" lies against one side of the pulley 40 and is borne against by one end of a helical spring 27" the opposite end of which lies against the standard 20", whereby the end face of the driving friction wheel 43 bears against inner circumferential margin of the adjacent washer 14 that is adhesively secured to the nearer end of the inner ball race 3. As the pulley 40 is driven, the driving friction wheel 43, in pressing against the inner ball race 3, rotates the latter, the balls 4 rolling around inside of the stationarily held outer ball race 2.

An emery or other abrasive grinding wheel 44 of relatively small diameter is entered into the bore of the inner ball race 3, and is rotated by suitable means (not shown) in the opposite direction to that in which the inner ball race 3 is being driven. By well known means the shaft 45 of the grinding wheel 44 is movable toward and away from the surface of the bore of the inner ball race 3, as is indicated by the arrow c, and is fed by known but unshown mechanism to increase the bore of the inner ball race 3. Also, the grinding wheel 44 is fed by known means laterally back and forth along the surface of the bore of the inner ball race 3, parallel to the axis thereof, as indicated by the arrow d.

Another micrometric measuring fixture is used to first initially indicate the radial variances existing in the bore of the inner ball race 3, and subsequently to determine the final accuracy of the bore after it has been ground. In this fixture, shown in Fig. 9, a standard 46 extends upward from a base 19''' and is provided with a socket 47, which has been carefully ground to the proportions of the outside diameter of the outer ball race 2.

Figure 9:
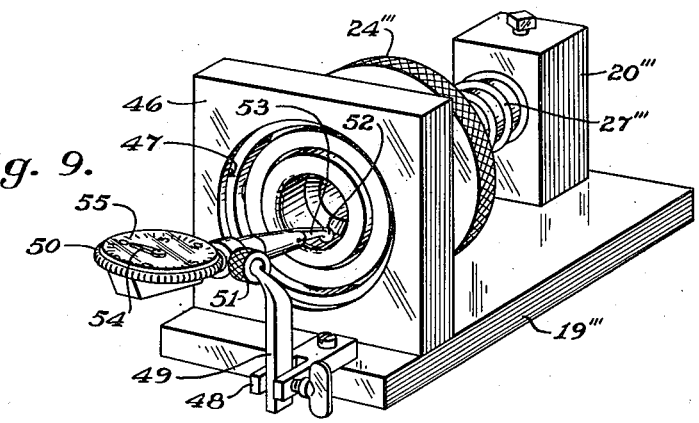
Fig. 9 is another perspective view, depicting a similar determination of the accuracy of the bore of the inner ball race.

After the completion of the grinding of the bore of the inner ball race 3 in the grinding machine of Fig. 7, the ball bearing 1 is removed from the socket 37 in the standard 38 of this machine, and is pushed into the socket 47 of the testing device of Fig. 9. The fit between the periphery of the outer ball race 2 and the surface of the socket 47 is sufficiently close to prevent the outer ball race 2 from turning, but is not too tight to prevent the ball race from being pushed out of the socket when it is desired to do so.

Another standard 20''' extends upward from the base 19''' and fixedly supports a stationary axle 27''' on which a driving friction wheel and a knurled turning knob 24''' therefor integral therewith are rotatively and slidably mounted as a unit. The driving friction wheel is hidden in Fig. 9, but is of the same construction as the driving friction wheel 43 shown in Fig. 7. Adjustably held by a bracket 48 fast on the base 19''' is a post 49 to which a micrometer indicator 50 is secured by an adjustable universal joint 51 that is tightened to become clamped to post 49 when in a selected position after the terminal ball 52 on a pivoted arm 53 has been applied to the surface of the bore of the inner ball race 3. Any radial variation in the bore surface of the inner ball race 3 angularly displaces the pivoted arm 53, which actuates the mechanism of the indicator 50, causing the pointer 54 to move over a scale 55 to indicate the radial variation of the bore of the inner ball race 3 in terms of tens-thousandths of an inch.

The hereinbefore described refinishing grinding operations on the periphery of the outer ball race 2 and the bore surface of the inner ball race 3 having been completed, the indicators 33 and 50 of the testing devices of Figs. 8 and 9, respectively, will disclose the degree of accuracy of these operations. Inasmuch as the grinding wheels are capable of being fed by known mechanism with an accuracy of a ten-thousandth of an inch, the diameters of the periphery of the outer ball race 2 and the bore of the inner ball race 3 will be highly satisfactorily refinished if they have radial variations from, say, zero to approximately one or two ten-thousandths of an inch. This will insure that shafts mounted in pairs of ball bearings refinished as described hereinbefore will be free from the minute but undesirable oscillatory axial deviations these shafts would have, or soon acquire, if mounted in ordinary commercial ball bearings. Accordingly, the errors due to the excessive radial irregularities present in commercial ball bearings are eliminated insofar as they produce accumulated errors in movements of machine elements and inaccuracies in mathematical answers derived from co-operative movements of such elements.

It will be recalled that, as already explained, the socket 37 in the grinding machine of Fig. 7 is itself very accurately ground to so closely fit the periphery of the outer ball race 2 as to keep this ball race from turning. Consequently, the socket 37 also constitutes a gage by means of which the accurate grinding of the outer ball race 2 is insured. Similarly, after the bore of the inner ball race 3 has been ground in the grinding machine of Fig. 7, and is presented to the unshown accurately ground stud in the testing fixture of Fig. 8, which stud corresponds to the stud 16 of Fig. 6, it will be at once seen whether the bore of the inner ball race 3 has been accurately ground to the proper diametrical dimension, since the stud in the device of Fig. 8 also constitutes a plug gage.

The lateral pressure maintained by the driving friction wheel 22 against the side of the outer ball race 2 in the grinding machine of Fig. 6, and by the driving friction wheel 43 against the sides of the inner ball race 3 by the grinding device of Fig. 7, keeps the raceways and the balls in mutual concentricity and also concentric with the refinished periphery of the outer ball race 2. The grinding of the bore of the inner ball race 3 makes the bore thereof truly concentric with the raceways of the ball races, the balls and the periphery of the outer ball race 2. Hence, the concentricity of all the elements of the ball bearing 1 is established to a very fine degree of accuracy, and bearings so ultimately produced are capable of maintaining the axes of the shafts they support in substantially perfect agreement with the required axes of rotation.

Next the ball bearing 1 is pushed out of the socket 37 in the standard 38 of the grinding device of Fig. 7, after which, it is freed from emery dust resulting from the grinding operations, by the use of a forced air current and a wiping operation. Thereafter the washers 14 and 15 are removed from the opposite sides of the inner and outer ball races and the bearing is lubricated with a filtered oil lubricant having a viscosity that keeps the ball bearing properly lubricated for future use. After being finally lubricated, the ball bearings are stored in dust-proof receptacles until wanted.

The hereinbefore described method and means for refinishing ball bearings are simple, but effect accurate results, conditioning ball bearings for highly exacting duties and performance for which they are not adequate prior to the treatment set forth herein. While a preferred method and means has been disclosed herein, it is to be understood that variations in either may be made without departing from the spirit of the invention as defined by the scope of the appended claims.

I claim:

1. The method of treating ball bearings which comprises dry cleaning the elements of a bearing, rotating said bearing with lateral pressure applied to parts thereof to maintain said elements in a state of mutual concentricity, and accurately finishing to size the outer and inner circumferential surfaces of said bearing.

2. The method of treating ball bearings which comprises cleaning the elements of the bearing, removably applying predeterminedly formed extraneous sealing means to the assembled bearing substantially sealing the interior thereof, rotating said assembled bearing so sealed with lateral pressure applied to parts thereof to maintain the elements in a state of mutual concentricity, accurately finishing to size the outer and inner circumferential surfaces of said bearing during the rotation thereof, and removing said extraneous sealing means after the completion of said finishing operations.

3. The method of treating ball bearings having inner and outer ball races and balls therebetween which comprises separating the outer ball race of a ball bearing from the remainder of the bearing, cleaning the outer ball race and separately dry cleaning the remainder of said bearing assembled, restoring the complete assembly of said ball bearing, removably applying predeterminedly formed extraneous sealing means to the reassembled bearing substantially sealing the interior thereof, successively rotating the ball races with a lateral thrust applied to the ball race being rotated and fixedly holding the other ball race thereby applying lateral pressure to the bearing to maintain the ball races and balls in a state of mutual concentricity, accurately finishing to size the outer and inner circumferential surfaces of the outer and inner ball races, respectively, during the rotation thereof, and removing said extraneous sealing means after the completion of said finishing operations.

4. The method of treating ball bearings having an outer ball race and an inner ball race, balls and a ball-retainer mutually combined which comprises removing and separately cleaning said outer ball race, imparting rotary motion to said mutually combined inner ball race, balls and ball-retainer as assembled and applying a succession of blows to said balls, replacing said outer ball race in normal assembly with said mutually combined inner race, balls and ball-retainer, removably applying extraneous sealing means to said ball bearing substantially sealing the same, successively rotating different parts of the bearing and simultaneously applying lateral pressure thereto, accurately finishing to size the outer and inner circumferential surfaces of said outer and inner ball races, respectively, during the successive rotations of said different parts of the bearing, and removing said extraneous sealing means after the completion of said finishing operations.

5. The method of treating ball bearings having outer and inner ball races and balls which comprises dry cleaning the outer ball race and separately dry cleaning the inner ball race and balls in combination, subsequently reassembling the ball bearing, testing the same for the sensitivity of the relative movements of its parts, temporarily substantially sealing the interior of the reassembled ball bearing, successively rotating different parts of the sealed ball bearing with lateral pressure applied thereto to maintain the ball races and balls in mutual concentricity, grinding to size the outer and inner circumferential surfaces of said outer and inner ball races, respectively, while the bearing is sealed, and unsealing the bearing after the grinding operations are completed.

6. Apparatus for treating ball bearings having outer and inner ball races and balls comprising a fixed holding member for mounting one of said ball races against rotation, a revolubly and slidably mounted driving member, rotating means therefor, pressure exerting means acting upon said driving member to apply the latter to the other ball race to rotate the same and said balls, and work-performing means applicable to the rotatable ball race.

7. Apparatus for treating ball bearings having outer and inner ball races and balls including a pair of devices each comprising a fixed holding member for mounting a different one of the ball races against rotation, revolubly and slidably mounted driving members for the respective devices that of each device being applicable to a different ball race of the bearing than is that of the other device, rotating means for each driving member, and pressure exerting means acting upon each driving member to rotatively apply the latter to the ball race it is associated with and with lateral pressure thereagainst, and work-performing means applicable to the ball race that is rotatably mounted in each device.

8. Apparatus for treating ball bearings having outer and inner ball races and balls including a pair of devices one having a fixed holder for non-rotatively mounting one of the ball races, means for rotating the other ball race and balls, and work-performing means for giving predetermined circumferential size to said rotating ball race, said other device comprising means for gaging and frictionally holding the formerly rotating ball race against rotation, means for rotating said formerly non-rotating ball race, and work-performing means for giving predetermined size to an annular surface of the last mentioned ball race.

9. The method for finishing ball bearings which method comprises mounting the bearing on a stationary stud, applying lateral pressure to and rotating the outer part of the bearing, finishing the outer part of the bearing, removing the bearing from the stud and mounting the bearing in a stationary socket, applying lateral pressure to and rotating the inner part of the bearing, and finishing the inner part of the bearing.

10. A machine for finishing ball bearings comprising a stationary holder adapted to receive and hold stationary one of the parts of a ball bearing, a rotatably mounted driving member for rotating the other part of the bearing, means for applying lateral pressure to the rotatable part of the ball bearing, means for rotating the driving member, and finishing means positioned to engage the rotating part of a bearing.

ERIC G. COLSON.